Oct. 4, 1927. W. S. WHITE Re. 16,764

FLUSHING VALVE

Original Filed July 17, 1923 2 Sheets-Sheet 1

Inventor
William S. White
By Fred J. Wilson Atty.

Oct. 4, 1927. W. S. WHITE Re. 16,764
FLUSHING VALVE
Original Filed July 17, 1923 2 Sheets-Sheet 2
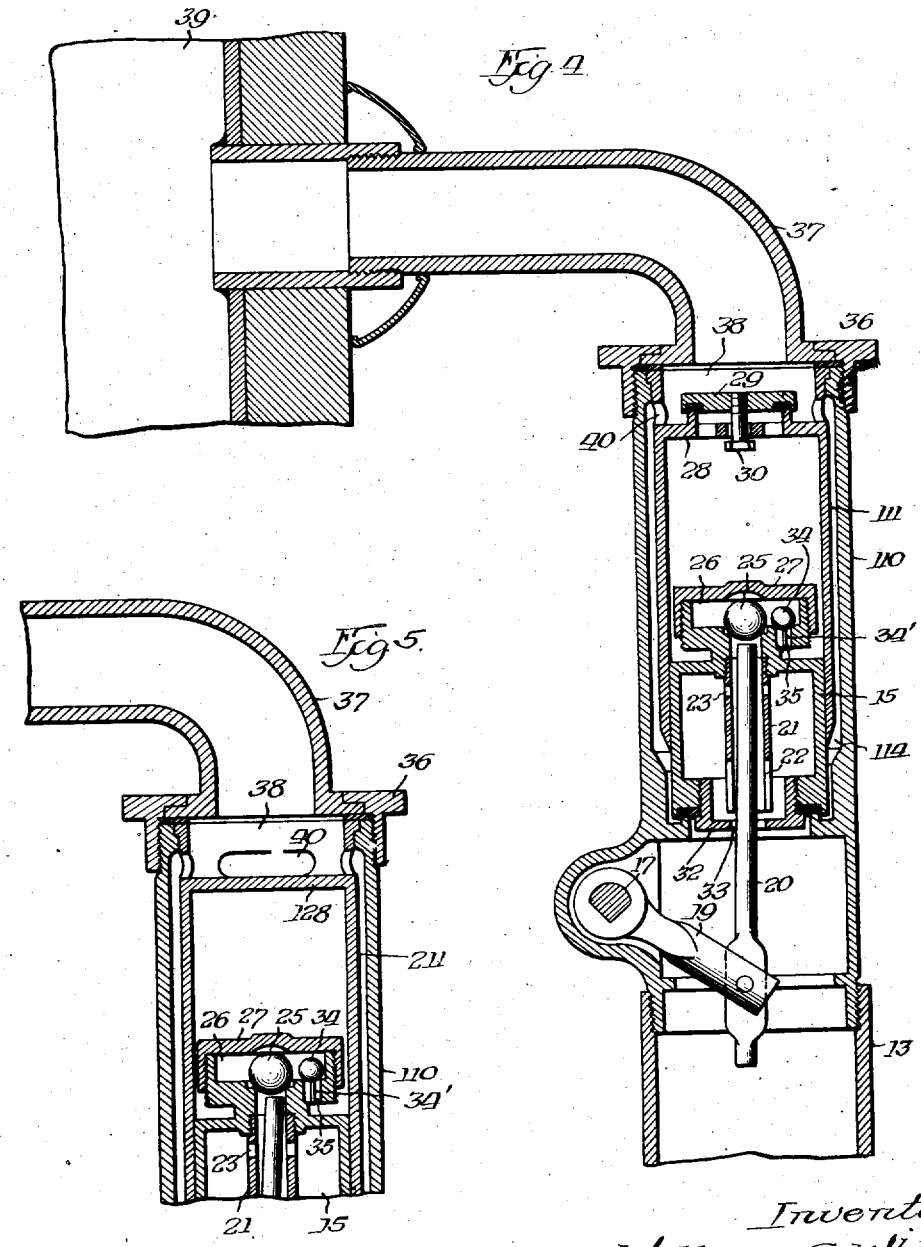
Inventor:
William S. White
By Ira J. Wilson Atty Reissued Oct. 4, 1927. Re. 16,764

UNITED STATES PATENT OFFICE.

WILLIAM SEARS WHITE, OF DENVER, COLORADO.

FLUSHING VALVE.

Original No. 1,511,927, dated October 14, 1924, Serial No. 652,126, filed July 17, 1923. Application for reissue filed July 22, 1926. Serial No. 124,281.

My invention relates to flushing valves and more particularly to that type of valve including a float piston movable in a vertical cylinder and in which manually operated means is provided at the exterior of the valve to give rocking movement to a shaft to cause the piston to be displaced to admit the flushing water.

The general object of the present invention is to improve in various particulars valves of the indicated type with a view to promote simplicity, attain increased efficiency, and provide a novel means for variously regulating the flushing period.

The nature of the invention, its distinguishing features and advantages, will clearly appear as the description proceeds.

Reference is to be had to the accompanying drawings forming a part of this specification, it being understood that the drawings are merely illustrative of practical examples of the invention.

Figure 4 is a vertical section of the valve in a slightly modified form;

Figure 5 is a fragmentary vertical section showing a further slight modification;

Figure 1:
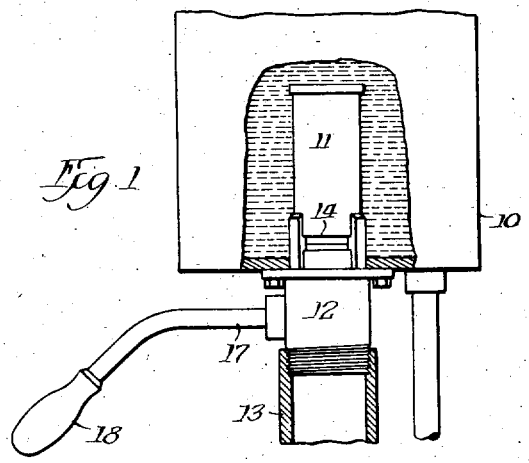
Figure 1 is a side elevation of a flushing valve shown partly broken away and part of a discharge pipe being shown in vertical section.

In the illustrated example of my invention the numeral 10 indicates a flushing tank mounted in which is a valve casing 11, the lower end of which has a chamber 12 rigid therewith and disposed below the bottom of the tank 10, said chamber 12 having threaded connection with a discharge pipe 13. The casing 11 has inlets 14 near the bottom thereof to admit water to the interior of the casing. A float piston 15 is vertically movable in the casing 11 and adapted to seat on an annular flange 16 at the base of the casing 11. Journaled in the chamber extension 12 is a rock shaft 17 having a laterally bent handle 18. On the rock shaft 17 is a lateral arm 19 extending into the chamber 12 and secured to the lower end of a vertical pin 20. The pin 20 extends upwardly through bottom of the float piston or main valve 15. The piston 15 is provided with a tube or sleeve 21 surrounding the upper end of the pin 20 and spaced therefrom. The sleeve 21 is slotted at its lower end as at 22 and near the upper end has holes 23. The space 121 between the tube 21 and pin 20 forms a passage for air and water as will appear.

Figure 2:
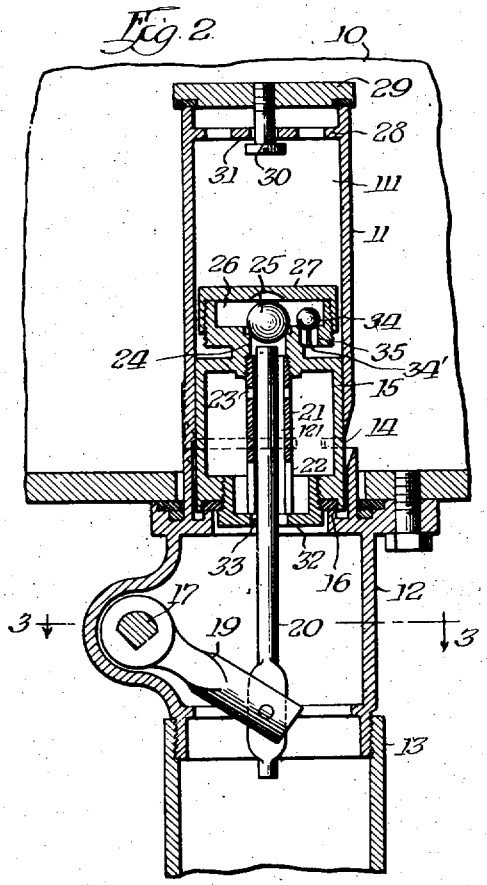
Figure 2 is an enlarged vertical section of the valve and part of the flushing tank.
Figure 3:
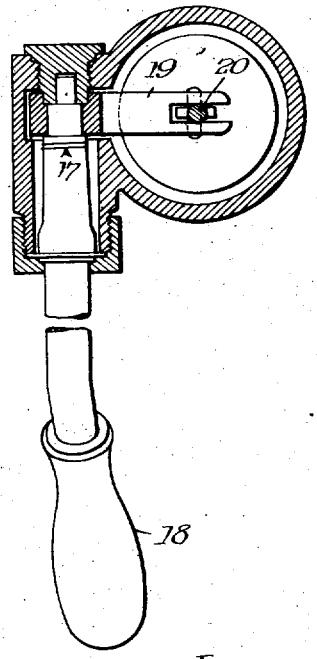
Figure 3 is a horizontal section on the line 3—3, Fig. 2.

Above the pin 20 the float valve 15 has a ball seat 24 at the top of which seats a ball valve or equivalent valve 25. Said valve has a control chamber 26 beneath a cap 27 on the piston, in the top of the casing 11 in the construction shown in Figures 1 to 3. Near the top of the casing 11 is a spider or partition 28 affording a flow of air and water and above the partition is a cap 29 having a depending headed pin 30 movable for adjustment in a ventral hole 31 of partition 28. The lower end of the piston 15 is closed by a hollow screw plug 32 which is provided with a hole or opening 33 through which the vertical pin 20 extends upwardly into tube 21. In the chamber 26 is a second valve 34 controlling the upper end of vertical passage 35 in the bottom of the chamber 26 to establish communication between said chamber 26 and the fluid storage chamber 111 or upper portion of the casing 11.

When the shaft 17 is rocked by its handle 18 the arm 19 will raise the pin 20 and lift the valve 25 from its seat, thereby opening the passage 121 and as the pin 20 continues to rise, it will lift the main valve 15 off its seat 16 and move it into the chamber 111. As the valve 15 is raised, the water, displaced from the chamber 111, can pass through the passage 35 past the valve 34 to the discharge connection or pipe 13, since the pin 20 holds the ball 25 off its seat. When the inlet openings or ports 14 are cleared water will be admitted to the discharge pipe for flushing the closet or urinal etc., and some will be admitted to the interior of the valve 15 from whence it will tend to flow into the storage chamber 111. Water permitted to pass through the inlet ports 14 and thence to the discharge pipe 13, exerts a downward pull on the piston 15. As the piston descends it tends to create a vacuum in the chamber 111, which vacuum is broken by the air or water or both within the hollow piston 15 being allowed to pass by the valve 25 and beneath the valve 34 through the passage 35 to chamber 111, it being understood that the valve 34 does not fit tightly on its seat but that a limited passage 34′ is provided beneath the valve by the formation of the seat. This needling passage 34′ may be provided in any manner as will be understood. It serves to delay filling of the storage chamber 111 and thus determines the rate of closing of valve 15.

The downward pull of the water on the sides and the accumulation of water in chamber 111 on the top of piston 15 finally seats the latter. The piston 15 is not tight in the casing 11 but permits the flow of water from the inlet 14 between the piston and said casing to the chamber 111, producing a pressure and cushion in said chamber, tending to cause the piston to seat without producing a water hammer. After the piston 15 is seated the water which has passed into the hollow piston 15 and displaced air while the piston is in operation, will escape through the slots 22 and hole 33 and the piston will again be filled with air so that the valve is ready for another operation. The valve 34 acts as a trap to prevent the contents of the hollow piston from passing too freely into the chamber 111 and a predetermined flushing period can be had by regulating the flow between the valve 34 and its seat in any desired manner. The loose cap 29 because of having limited vertical movement permits air to pass through the spider 28 and outward from the top of the chamber 111 to the top of the tank 10 or pipe 39 or to a supply pipe to finally pass, if desired, to auxiliary air storage chambers provided in connection with some forms of valves of this general type.

In the form shown in Figure 4 the casing 111 corresponds essentially with the casing 11, except that at its base below the inlet 114 the casing is formed integral with an outer housing or shell 110 to contain water, in lieu of the tank 10. Said housing 110 has a cap 36 which secures the flanged lower end on an inlet pipe 37 leading into the top of said housing. The casing 111 and its appurtenances as well as the valve and its operating and controlling pin 20 are the same as in the previously described construction except that the casing 111 above the loose cap 29 has an integral extension 38 communicating directly with the inlet pipe 37. Said inlet pipe 37 may lead from a tank or supply pipe 39.

In the form shown in Figure 5 the construction is the same as in Figure 4 except that the cap 29 and pin 30 are omitted. Instead of the spider or partition 28, a closed top 128 is provided on the casing 111. In the constructions shown in Figure 4 and also in Figure 5 the extension 38 has lateral openings 40 above the casing which in Figure 5 is designated 211. Water may flow from the pipe 37 through the extension 38 and outwardly through the openings 40 to the space between the casing 111 and the housing 110, thence to the inlet 114.

Figure 6:
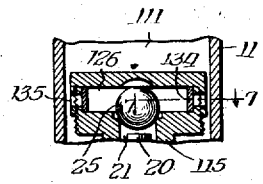
Figure 6 is a detail of the upper portion of the piston showing a modification.
Figure 7:
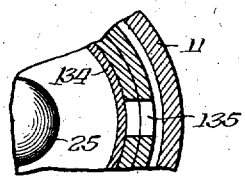
Figure 7 is a fragmentary horizontal section in the plane indicated by the line 7—7, Figure 6.

In Figures 6 and 7 in lieu of the valve 34 and passage 35 an equivalent check valve assemblage is provided, comprising an annular resilient band 134 controlling lateral openings 135 that establish communication between the chamber 126 corresponding with the chamber 26 whereby to control communication between the chamber 111 of casing 11 and the interior of the hollow piston 15 through the passage 221 corresponding with the passage 121.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

I claim:

1. In a flush valve mechanism having a fluid inlet port and a fluid outlet port and a connecting passageway, a fluid storage chamber adjacent said passageway, a valve between said chamber and passageway for controlling communication between said inlet and outlet ports, said valve having an auxiliary chamber therein and an orifice communicating between said auxiliary chamber and said storage chamber and a second orifice communicating between said auxiliary chamber and said passageway, gravity operated means normally closing one and substantially closing the other of said orifices, and manually operable means for displacing the means closing the second said orifice for opening the same.

2. In a mechanism of the character described having a fluid inlet port and a fluid outlet port, a valve normally closing said outlet port and means for controlling said valve comprising, a fluid chamber having an orifice communicating with said outlet port, gravity operated check means normally preventing fluid flow from said chamber to said outlet port, a second fluid chamber having an opening in communication with the first said chamber at all times, gravity operated means for restricting fluid flow through said opening from the first to the second chambers, and manually operable means for moving said check means to uncover said orifice.

3. In a flush mechanism of the character described having a passageway, fluid inlet and outlet ports to said passageway and a valve for interrupting communication between said ports, means for controlling the closing movement of said valve comprising, a fluid storage chamber above said valve, a fluid regulating chamber in said valve and between said storage chamber and passageway, said regulating chamber having two orifices one communicating between said passageway and said regulating chamber and the other communicating between said regulating and storage chambers, and means including a gravity closing check valve normally substantially closing the last said orifice but permitting the bleeding of fluid from said regulating chamber to said storage chamber.

4. In a flush mechanism of the character described having a fluid inlet port, a fluid discharge port and a main valve for interrupting communication between said ports, a fluid storage chamber above said valve for reception of a fluid for control of the opening and closing movements of said valve, said valve having an auxiliary chamber therein, said auxiliary chamber having an orifice communicating with said storage chamber and a second orifice affording communication between said auxiliary chamber and ports, gravity operated check valves in said auxiliary chamber normally closing the second of said orifices and substantially closing the first of said orifices except for a fluid bleed channel therepast, and manually operable means for displacing the gravity operated check valve closing the second said orifice and for displacing said main valve upwardly into said chamber for opening communication between said ports.

5. In a flush valve provided with a water inlet and a water outlet, a shut-off valve, means for opening the shut-off valve and a control device for restricting the closing movements of the shut-off valve, said control device including a water storage chamber and a piston in said chamber having a passage through which fluid flows to and from said storage chamber from said inlet and to said outlet respectively, non-floating gravity means between portions of said passage for restricting the passage of fluid therethrough in one direction during the closing movements of said shut-off valve and for closing said passage entirely when said shut-off valve is closed, and means for fully opening said passage for opening said shut-off valve.

6. In a flush valve, a water inlet, a water outlet, means providing a fluid chamber above said inlet and outlet, valve means within said chamber for interrupting communication between said inlet and outlet and movable between predetermined limits on opening and closing communication therebetween, a fluid conduit from said chamber adapted to communicate both with said inlet and outlet, a first valve in said conduit operative on movement of said valve means in one direction for restricting fluid flow through said conduit to said chamber, a second valve in said conduit for closing said conduit to passage of fluid from said chamber, said first valve being inoperative to restrict said conduit on flow of fluid through said conduit from said chamber, said second valve being inoperative to close said conduit to fluid passing to said chamber, and means for rendering said second valve inoperative to close said conduit to passage of fluid from said chamber, said first and second valves having the same sense of operation.

7. In a flush valve, a water inlet connection, a water outlet connection, a fluid chamber adjacent one of said water connections, means in said chamber operatively movable therein to open and close communication between said connections, a fluid conduit in said means communicating between the interior of said chamber and one of said connections, means operative on movement of the first said means substantially to close communication between said connections for restricting fluid flow through said conduit into said chamber, means operative to close said conduit after said first said means has operated to close communication between said connections for preventing any return flow of fluid from said chamber to either of said connections, and means for rendering the last said means inoperative, the second and third said means being operative in the same sense.

8. In a valve of the character described having a chamber and a valve operating piston in the chamber, said piston having a conduit therethrough communicating between the interior of the chamber and with water inlet and outlet connections of the valve, a pair of valve seats in said conduit oppositely directed relative to fluid flow through the conduit, gravity operated valve members cooperative with said seats for preventing fluid flow through said conduit in one direction and restricting fluid flow therethrough in the opposite direction, and means for rendering said gravity operated valves inoperative to prevent fluid flow through said conduit in the first said direction.

9. In a flush valve of the character described, means providing two fluid chambers, one of the chambers having a port communicating with a place of fluid discharge and a source of fluid supply, the second fluid chamber communicating with the first said chamber through a second port, gravity operated check valves for preventing the free fluid flow in either direction through said ports, means providing a fluid bleed past one of said check valves when it closes its port, the said check valve past which the fluid bleed is provided being inoperative materially to effect fluid flow through its port in the opposite direction, and means for rendering the other said check valve closing the other said port inoperative.

10. A valve of the class described, comprising means providing a chamber having a water inlet and outlet near and below one end, reciprocal means operative in said chamber and movable between said water inlet end and an opposite end thereof for normally closing said inlet, a second chamber in and movable with said reciprocal means and having a passage adapted to communicate with said inlet when the second chamber is in one position and adapted to communicate with a water discharge connection when the second chamber is in another position, a passage providing communication between the second and first said chambers, gravity operated non-floating valves controlling each of said passages and adapted to permit fluid to be relatively freely discharged from the first said chamber through the second said chamber to said discharge connection upon movement of said reciprocal means to open said water inlet and adapted to relatively reduce the rate of flow from said inlet through one of said passages on return of said reciprocal means to inlet closing position, and means for moving said reciprocal means to open said inlet.

11. A valve of the class described comprising a casing providing a storage chamber interior thereof and having an inlet for water near its lower end, a hollow reciprocal member operating in said casing and formed with a separate chamber at the top thereof, said member having a passage establishing communication between its hollow interior and the said separate chamber, a gravity operated valve controlling said passage, a second passage leading from said separate chamber to the chamber interior of said casing, a non-floating gravity operating valve controlling the second said passage, and manually operable means to displace the first-mentioned valve and cause said member to rise in said casing above the said inlet.

12. A valve of the class described comprising a casing providing a storage chamber interior thereof and having an inlet for water near its lower end, a hollow piston operating in said casing and formed with a separate chamber at the top of the piston, said piston having a passage establishing communication between the hollow interior of the piston and the said separate chamber, a gravity closing valve controlling said passage, a second valve controlled passage leading from said separate chamber to the storage chamber interior of said casing, a non-floating valve in said second passage, and a manually movable pin extending upwardly through the bottom of the casing and adapted to displace the first-mentioned valve and cause the piston to rise in the casing.

13. A valve of the class described comprising a casing having an inlet for water near its lower end, a hollow piston operating in said casing and formed with a separate chamber at the top of the piston, said piston having a passage establishing communication between the piston and the said chamber, a gravity closing valve controlling said passage, a second valve controlled passage leading from said chamber to the interior of said casing, the valve for controlling the second said passage being also gravity operated, and a manually movable pin extending upwardly through the bottom of the casing and adapted to displace the first-mentioned valve and cause the piston to rise in the casing; together with a tube in the hollow piston surrounding said pin and slotted at its lower end, the lower end of the piston having a hole for the inflow and outflow of water.

In witness hereof I have affixed my signature.

WILLIAM SEARS WHITE.